(12) United States Patent
Geskes et al.

(10) Patent No.: US 9,109,532 B2
(45) Date of Patent: Aug. 18, 2015

(54) INTERNAL COMBUSTION ENGINE

(75) Inventors: Peter Geskes, Ostfildern (DE);
Eberhard Pantow, Winnenden (DE)

(73) Assignee: MAHLE Behr GmbH & Co. KG, Stuttgart (DE)

( * ) Notice: Subject to any disclaimer, the term of this patent is extended or adjusted under 35 U.S.C. 154(b) by 426 days.

(21) Appl. No.: 13/410,625

(22) Filed: Mar. 2, 2012

(65) Prior Publication Data

US 2012/0222420 A1 Sep. 6, 2012

(30) Foreign Application Priority Data

Mar. 3, 2011 (DE) .................. 10 2011 005 072

(51) Int. Cl.
*F01K 23/10* (2006.01)
*F02B 33/44* (2006.01)
*F02M 25/07* (2006.01)
*F02G 5/02* (2006.01)
(Continued)

(52) U.S. Cl.
CPC . *F02G 5/02* (2013.01); *F01K 9/003* (2013.01);
*F01K 23/065* (2013.01); *F01P 9/00* (2013.01);
*F02M 25/0707* (2013.01); *F02M 25/0731*
(2013.01); *F02B 29/0425* (2013.01); *F02M
25/0732* (2013.01); *Y02T 10/121* (2013.01);
*Y02T 10/166* (2013.01)

(58) Field of Classification Search
CPC .......... F01K 23/10; F01K 7/22; F01K 9/003;
F01K 23/065; F02G 5/00; F02G 5/02; F02G
5/04; F01P 9/00; F02M 25/0707; F02M
25/0731; F02M 25/0732; F02M 25/0738;
F02B 29/0425; Y02T 10/121; Y02T 10/166

USPC .................. 60/618, 616, 620, 605.2, 599
See application file for complete search history.

(56) References Cited

U.S. PATENT DOCUMENTS 8,776,517 B2 * 7/2014 Ernst et al. ................. 60/616
2005/0262842 A1 * 12/2005 Claassen et al. ............ 60/618
(Continued)

FOREIGN PATENT DOCUMENTS

DE 10 2009 050 263 A1 * 6/2010 .............. F01K 23/10
DE 10 2009 039 551 A1 3/2011
(Continued)

OTHER PUBLICATIONS

DE 10 2009 050 263 A1 machine translation.*

*Primary Examiner* — Thai Ba Trieu
*Assistant Examiner* — Jason T Newton
(74) *Attorney, Agent, or Firm* — Muncy, Geissler, Olds & Lowe, P.C.

(57) ABSTRACT

In an internal combustion engine having a system for utilizing the waste heat from the internal combustion engine via the Clausius-Rankine cycle, a system includes a circuit having lines with a working medium, a working medium pump, a vaporizer-exhaust gas heat exchanger, and a vaporizer-EGR heat exchanger, an expander, and a condenser for liquefying the vaporous working medium. The line for the working medium is run from the condenser to the vaporizer-EGR heat exchanger so that the working medium, after flowing through the condenser, first flows through the vaporizer-EGR heat exchanger, and the line for the working medium is run from the vaporizer-EGR heat exchanger to the vaporizer-exhaust gas heat exchanger so that the working medium, after flowing through the vaporizer-EGR heat exchanger, first flows through the vaporizer-exhaust gas heat exchanger.

13 Claims, 2 Drawing Sheets

(51) Int. Cl.
  *F01K 9/00* (2006.01)
  *F01K 23/06* (2006.01)
  *F01P 9/00* (2006.01)
  *F02B 29/04* (2006.01)

(56) References Cited

U.S. PATENT DOCUMENTS

| | | | |
|---|---|---|---|
| 2009/0260775 A1* | 10/2009 | Maucher et al. | 165/41 |
| 2009/0277173 A1* | 11/2009 | Ernst et al. | 60/616 |
| 2010/0018207 A1* | 1/2010 | Juchymenko | 60/670 |
| 2010/0139626 A1* | 6/2010 | Raab et al. | 123/540 |
| 2010/0180584 A1* | 7/2010 | Berger et al. | 60/320 |
| 2011/0072816 A1* | 3/2011 | Ernst et al. | 60/616 |
| 2012/0036850 A1* | 2/2012 | Ernst et al. | 60/615 |
| 2012/0067332 A1* | 3/2012 | Wu | 123/568.12 |
| 2013/0199178 A1* | 8/2013 | Kanou et al. | 60/605.2 |
| 2013/0205776 A1* | 8/2013 | Yin et al. | 60/615 |

FOREIGN PATENT DOCUMENTS

| | | | |
|---|---|---|---|
| WO | WO 2007/115579 A2 | 10/2007 | |
| WO | WO 2012043335 A1 * | 4/2012 | F01K 23/10 |

\* cited by examiner

INTERNAL COMBUSTION ENGINE

This nonprovisional application claims priority under 35 U.S.C. §119(a) to German Patent Application No. DE 10 2011 005 072.8, which was filed in Germany on Mar. 3, 2011, and which is herein incorporated by reference.

FIELD OF THE INVENTION

The invention relates to an internal combustion engine having a system for utilizing the waste heat from the internal combustion engine by means of the Clausius-Rankine cycle process according to the preamble of claim 1 and a method for operating an internal combustion engine with the system according to the preamble of claim 6.

BACKGROUND OF THE INVENTION

Internal combustion engines are used in various technical applications for converting thermal energy into mechanical energy. In motor vehicles, especially in trucks, internal combustion engines are used to move the motor vehicle. The efficiency of internal combustion engines can be increased by the use of systems for utilizing the waste heat from the internal combustion engine by means of the Clausius-Rankine cycle process. In this process, the system converts the waste heat from the internal combustion engine into mechanical energy. The system comprises a circuit having lines with a working medium, e.g., water, a working medium pump for delivering the working medium, a vaporizer for vaporizing the liquid working medium, an expander, a condenser for liquefying the vaporous working medium, and a collecting and equalizing tank for the liquid working medium. By the use of such systems in the internal combustion engine, the overall efficiency of the internal combustion engine can be increased with such a system as a component of the internal combustion engine.

In this regard, a vaporizer-exhaust gas heat exchanger and a vaporizer-exhaust gas recirculation [EGR] heat exchanger are used in motor vehicles as a vaporizer for heating and vaporizing the working medium. The exhaust gas passed through the vaporizer-exhaust gas heat exchanger comes from an exhaust gas turbine as a main exhaust stream and the exhaust gas passed through the vaporizer-EGR heat exchanger comes from an exhaust gas recirculation line and after passage through the vaporizer-EGR heat exchanger is again supplied to the internal combustion engine in that the exhaust gas is introduced into a charge air line. To achieve a Clausius-Rankine cycle process efficiency as high as possible, it is necessary to heat, vaporize, and superheat the working medium to as high a temperature as possible. From the thermodynamic standpoint, it is therefore expedient to pass the exhaust gas, discharged from the condenser, first through the vaporizer-exhaust gas heat exchanger and then through the vaporizer-EGR heat exchanger. In so doing, the exhaust gas passed through the vaporizer-exhaust gas heat exchanger has lower temperatures than the exhaust gas passed through the vaporizer-EGR heat exchanger. For example, the exhaust gas passed through the vaporizer-exhaust gas heat exchanger has a temperature of 280° C. to 380° C. and the exhaust gas passed through the vaporizer-EGR heat exchanger has a temperature in the range of 500° C. to 700° C. As a result, the working medium can be first heated and at least partially vaporized in the vaporizer-exhaust gas heat exchanger and then completely vaporized and superheated in the vaporizer-EGR heat exchanger. As a departure from this, it is also known to pass the working medium after it is discharged from the condenser first partially through the vaporizer-EGR heat exchanger, then to pass the working medium, partially passed through the vaporizer-EGR heat exchanger, through the vaporizer-exhaust gas heat exchanger, and then to pass the working medium, passed through the vaporizer-exhaust gas heat exchanger, through the vaporizer-EGR heat exchanger. Moreover, it is also known to connect in parallel the vaporizer-exhaust gas heat exchanger and the vaporizer-EGR heat exchanger relative to the fluid stream with the working medium after discharge from the condenser.

Greatly increased temperatures occur at the vaporizer-EGR heat exchanger at the exhaust gas inlet side and this leads to high thermal expansions and damage of the vaporizer-EGR heat exchanger. The high temperatures in the vaporizer-EGR heat exchanger lead to a nonhomogeneous distribution of the working medium and thereby to a local dry-out in the individual regions of the vaporizer-EGR heat exchanger. The result is very high local temperatures, so-called hot spots, which may lead to decreased performance. When ethanol or organic working media of the Clausius-Rankine cycle process are used, the hot spots lead to degradations because wall temperatures above 400° C. may occur here. Lubricating oil as well, which is present in the working medium for lubricating the expander, can be degraded by the high temperatures in the vaporizer-EGR heat exchanger.

SUMMARY OF THE INVENTION

For this reason, the object of the present invention is to provide an internal combustion engine and a method for operating an internal combustion engine having a system for utilizing the waste heat from an internal combustion engine by means of the Clausius-Rankine cycle process, said system in which the vaporizer-EGR heat exchanger is exposed to low thermal stresses and thereby has a long service life.

This object is attained with an internal combustion engine having a system for utilizing the waste heat from the internal combustion engine by means of the Clausius-Rankine cycle process, said system comprising a circuit having lines with a working medium, especially water, to form the system, a working medium pump for delivering the working medium, a vaporizer-exhaust gas heat exchanger and a vaporizer-EGR heat exchanger for heating and/or vaporizing the liquid working medium with the exhaust gas, an expander, a condenser for liquefying the vaporous working medium, preferably a collecting and equalizing tank for the liquid working medium, whereby the line for the working medium is run from the condenser to the vaporizer-EGR heat exchanger, so that the working medium after flowing through the condenser, the collecting tank, and the high-pressure pump flows first, especially exclusively, through the vaporizer-EGR heat exchanger and the line for the working medium is run from the vaporizer-EGR heat exchanger to the vaporizer-exhaust gas heat exchanger, so that the working medium after flowing through the vaporizer-EGR heat exchanger flows first, especially exclusively, through the vaporizer-exhaust gas heat exchanger.

In the line, which is arranged between the vaporizer-EGR heat exchanger and the vaporizer-exhaust gas heat exchanger, a vapor measuring point can be arranged with which the vapor portion downstream of the vaporizer-EGR heat exchanger can be determined and then also regulated by means of the pump. Said vapor measurement can be made by a throttle device at which the differential pressure is measured. The present vapor content can then be determined with the measured fluid mass flow via a pressure loss characteristic map.

Alternatively, the vapor content can also be determined using a density measurement or a conductivity sensor.

The vaporizer-EGR heat exchanger and the vaporizer-exhaust gas heat exchanger are thus connected in series relative to the fluid stream with the working medium and the working medium first flows completely through the vaporizer-EGR heat exchanger and then completely through the vaporizer-exhaust gas heat exchanger. The exhaust gas passed through the vaporizer-EGR heat exchanger has higher temperatures, e.g., within the range of 500° to 700° C. than the exhaust gas passed through the vaporizer-exhaust gas heat exchanger. As a result, the vaporizer-EGR heat exchanger does not heat up to very high temperatures, because the liquid working medium, discharged from the condenser and delivered by the high-pressure pump, is introduced directly into the vaporizer-EGR heat exchanger. As a result, only temperatures up to maximum 350° C. occur in general at the vaporizer-EGR heat exchanger, so that disadvantageous hot spots with very high temperatures, which can lead to a degradation of the organic working medium or lubricating oil in the working medium, are avoided. Further, as a result, thermal stresses on the vaporizer-EGR heat exchanger can be greatly reduced, so that it has a long service life. In the vaporizer-EGR heat exchanger the working medium is generally only partially vaporized, e.g., to a vapor content of approximately 75%. As a result, a local dry-out of the vaporizer-EGR heat exchanger can be prevented. The two-phase mixture of the working medium, discharged from the vaporizer-EGR heat exchanger, is then taken to the vaporizer-exhaust gas heat exchanger and completely vaporized in it. The exhaust gas passed through the vaporizer-exhaust gas heat exchanger only has temperatures within the range of 280° C. to 380° C., so that the working medium in the vaporizer-exhaust gas heat exchanger generally heats up only to temperatures of up to a maximum of 350° C. As a result, degradation of the organic working medium or ethanol and of the lubricating oil can be substantially ruled out and superheated regions do not occur at any location.

In particular, the working medium passed through the vaporizer-EGR heat exchanger is exclusively the working medium, discharged directly from the condenser, and/or the working medium passed through the vaporizer-exhaust gas heat exchanger is exclusively the working medium, discharged directly from the vaporizer-EGR heat exchanger. The working medium discharged from the condenser is therefore passed not directly through the vaporizer-exhaust gas heat exchanger after discharge from the condenser, but is passed first completely through the vaporizer-EGR heat exchanger after discharge from the condenser and only then supplied to the vaporizer-exhaust gas heat exchanger.

In another embodiment, the circuit for the working medium does not have a line leading directly from the condenser to the vaporizer-exhaust gas heat exchanger and/or an outlet opening for the exhaust gas from the vaporizer-exhaust gas heat exchanger opens into the environment and an outlet opening for the exhaust gas from the vaporizer-EGR heat exchanger opens into a charge air line.

In a supplementary embodiment, the working medium and the exhaust gas can be passed according to the counterflow principle through the vaporizer-exhaust gas heat exchanger.

Preferably, the working medium and the exhaust gas can be passed according to the counterflow principle through the vaporizer-EGR heat exchanger and/or a method described in this industrial property application can be carried out by the internal combustion engine.

The method of the invention for operating an internal combustion engine having a system for utilizing the waste heat from the internal combustion engine by means of the Clausius-Rankine cycle process, especially an internal combustion engine described in this industrial property application, comprising the steps: passing a working medium through a vaporizer-exhaust gas heat exchanger and a vaporizer-EGR heat exchanger, so that the working medium heats up and is vaporized; passing the exhaust gas through the vaporizer-exhaust gas heat exchanger and the vaporizer-EGR heat exchanger; conveying the gaseous working medium to an expander in which the gaseous working medium expands and performs work; conveying the working medium from the expander to a condenser; cooling and condensing the working medium in the condenser, whereby the working medium after passage through the condenser is supplied first, especially exclusively, to the vaporizer-EGR heat exchanger. The working medium discharged from the condenser is supplied completely via the line first to the vaporizer-EGR heat exchanger and passed through said heat exchanger and then after discharge from the vaporizer-EGR heat exchanger passed completely through the vaporizer-exhaust gas heat exchanger.

In a variant, the working medium after passage through the vaporizer-EGR heat exchanger is supplied, especially exclusively, to the vaporizer-exhaust gas heat exchanger.

Expediently, the working medium during the conveying from the condenser to the vaporizer-EGR heat exchanger is not passed through any heat exchanger, especially an exhaust gas heat exchanger or vaporizer, and/or the working medium during conveying from the vaporizer-EGR heat exchanger to the vaporizer-exhaust gas heat exchanger is not passed through any heat exchanger, especially an exhaust gas heat exchanger or vaporizer.

In another embodiment, the exhaust gas passed through the vaporizer-exhaust gas heat exchanger is discharged into the environment and the exhaust gas passed through the vaporizer-EGR heat exchanger is supplied to the internal combustion engine.

In particular, the working medium in the circuit as a heat exchanger is passed only through the condenser, the vaporizer-exhaust gas heat exchanger, and the vaporizer-EGR heat exchanger and/or the working medium is delivered by a working medium pump to a circuit.

In another embodiment, the expander is a turbine or a reciprocating piston engine.

In another embodiment, the waste gas from the main exhaust gas stream of the internal combustion engine and the waste heat from the exhaust gas recirculation can be utilized by the system as a component of the internal combustion engine.

In another embodiment, the system comprises a generator. The generator can be driven by the expander, so that the system can thereby provide electrical energy or electric current.

In another embodiment, water as a pure substance, R245fa, ethanol (pure substance or mixture of ethanol with water), methanol (pure substance or mixture of methanol and water) longer-chain alcohols C5 to C10, longer-chain hydrocarbons C5 (pentane) to C8 (octane), pyridine (pure substance or mixture of pyridine with water), methylpyridine (pure substance or mixture of methylpyridine with water), trifluoroethanol (pure substance or mixture of trifluoroethanol with water), hexafluorobenzene, at least one silicone oil, silicone oils, a water/ammonia solution, and/or a water-ammonia mixture are employed as the working medium of the system.

BRIEF DESCRIPTION OF THE DRAWINGS

An exemplary embodiment of the invention will be described in greater detail hereinafter with reference to the appended drawings. In the drawing.

DETAILED DESCRIPTION

Figure 1:
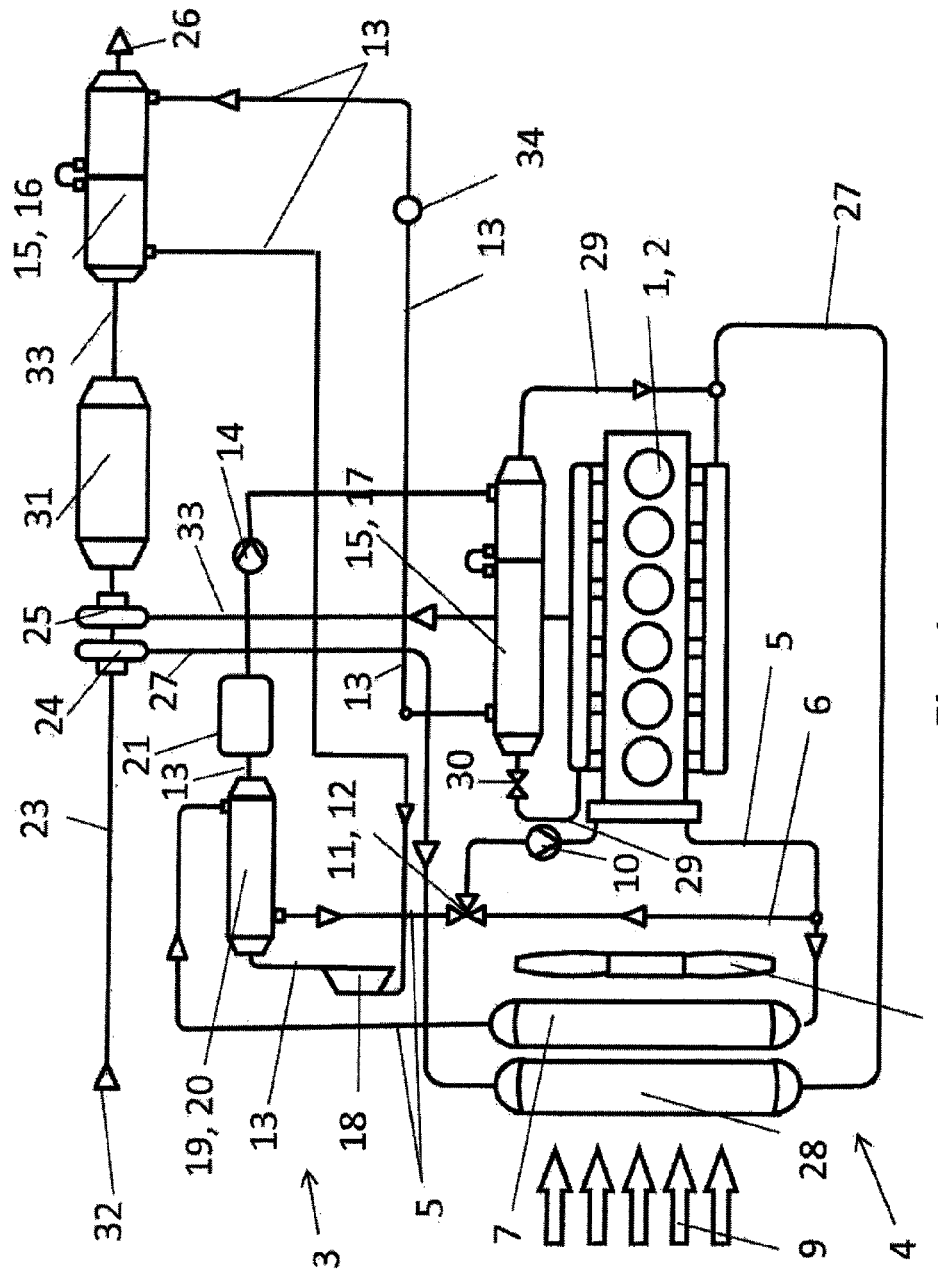
FIG. 1 shows a highly simplified representation of an internal combustion engine with a system for utilizing the waste heat from the internal combustion engine.

In FIG. 1, an internal combustion engine 1, formed as an internal combustion reciprocating piston engine 2, is shown which has a system 3 for utilizing the waste heat from internal combustion engine 1 by means of the Clausius-Rankine cycle process. Internal combustion engine 1 has a charge air compressor 24. Charge air compressor 24 draws in fresh air 32 through a fresh air line 23 and compresses the fresh air 32 in a charge air line 27 and a charge air cooler 28, integrated into the charge air line 27, cools the charge air before it is supplied to internal combustion engine 1, in that the heat is given off to the cooling air 9. The exhaust gas is removed from internal combustion engine 1 through an exhaust gas line 33 and cooled in an exhaust gas turbine 25, an exhaust gas after treatment unit 31, and in a vaporizer 15 designed as a vaporizer-exhaust gas heat exchanger 16, and then exhaust gas 26 is conveyed into the environment. Exhaust gas turbine 25 driven by exhaust gas 26 drives charge air compressor 24. In addition, part of exhaust gas 26 given off by internal combustion engine 1 is supplied through an exhaust gas recirculation line 29, having an exhaust gas valve 30, to charge air line 27 and passed beforehand through a vaporizer-EGR heat exchanger 17. Exhaust gas 26, discharged via exhaust gas line 33 from internal combustion engine 1, is not passed through vaporizer-EGR heat exchanger 17. In line 13, which is arranged between vaporizer-EGR heat exchanger 17 and vaporizer-exhaust gas heat exchanger 16, a vapor measuring point 34 can be arranged with which the vapor portion downstream of vaporizer-EGR heat exchanger 17 can be determined and then also regulated by means of pump 14.

Coolant flows through a coolant circuit 4 with coolant lines 5 and the circuit serves to cool internal combustion engine 1. For this purpose, a coolant heat exchanger 7 is integrated into coolant circuit 4. The heat taken up by the coolant at internal combustion engine 1 is given off in coolant heat exchanger 7 to the ambient air as cooling air 9. A coolant circulating pump 10, integrated into coolant circuit 4, delivers the coolant into coolant lines 5. To this end, a fan 8 conveys cooling air 9 to coolant heat exchanger 7 and to charge air cooler 28.

System 3 has lines 13 with a working medium. An expander, 18, a condenser 19 as condenser heat exchanger 20, a collecting and equalizing tank 21, as well as a working medium pump 14 and two vaporizers 15 are integrated into the circuit with the working medium. The two vaporizers 15 in this case are vaporizer-exhaust gas heat exchanger 16, in which the working medium is vaporized or heated by the waste heat from the exhaust gas passed through exhaust gas line 33, and vaporizer-EGR heat exchanger 17, in which the working medium is vaporized or heated by the exhaust gas passed through EGR line 29. The working medium discharged from condenser 19 is supplied exclusively first to vaporizer-EGR heat exchanger 17 and the working medium discharged from vaporizer-EGR heat exchanger 17 is supplied exclusively first to vaporizer-exhaust gas heat exchanger 16 with lines 13.

The liquid working medium is drawn out of collecting and equalizing tank 21 by working medium pump 14 and increased to a higher pressure level in the circuit, pumped into vaporizer 15, and then the liquid working medium vaporizes in vaporizers 15 and then performs mechanical work in expander 18, in that the gaseous working medium, especially water, expands and subsequently has a low pressure. The gaseous working medium is liquefied in condenser 19 as condenser heat exchanger 20 and then again supplied to collecting and equalizing tank 15. The mechanical energy provided by expander 18 can be used, for example, directly for the movement of a truck (not shown) or converted into electrical energy by a generator (not shown).

The coolant removed from coolant heat exchanger 7 is supplied directly, i.e., with essentially no temperature change, to condenser heat exchanger 20 through coolant line 5. Coolant, which has been cooled in coolant heat exchanger 7 after passage through coolant heat exchanger 7, is used exclusively to cool the working medium in condenser heat exchanger 20. In this way, coolant at a very low temperature level can be provided to condenser heat exchanger 20. The temperature of the coolant in coolant circuit 4 is controlled and/or regulated with a control element 11 designed as 3/2-way valve 12. A bypass coolant line 6 removes coolant at coolant line 5 from the internal combustion engine 1 to coolant heat exchanger 7 and takes it to 3/2-way valve 12. This coolant, removed from the above-described coolant line 5 at 3/2-way valve 12, can be again supplied to coolant line 5, which runs from 3/2-way valve 12 to internal combustion engine 1. In addition, coolant circulating pump 10 is also integrated in said coolant line 5 from 3/2-way valve 12 to internal combustion engine 1. The more coolant is removed by bypass coolant line 6 from coolant line 5 between internal combustion engine 1 and coolant heat exchanger 7, the less coolant is passed through coolant heat exchanger 7 and the more the temperature in the coolant increases and vice versa. A temperature sensor (not shown) in coolant circuit 4 detects the temperature of the coolant and controls and/or regulates it according to a predefined target value. This temperature sensor, which is not shown, is preferably integrated into coolant line 5 from control element 11 to internal combustion engine 1. Expediently, said temperature sensor, which is not shown, is part of 3/2-way valve 12. The target value for the temperature of the coolant, which is supplied in coolant line 5 to internal combustion engine 1, is, for example, within a range between 85° C. and 95° C.

Condenser 19 is a condenser heat exchanger 20 and coolant flows through it. The working medium in condenser 19 is cooled and condensed by means of the coolant. The working medium discharged from condenser 19 after passage through collecting and equalizing tank 21 is supplied completely to vaporizer-EGR heat exchanger 17 by means of working medium pump 14 (FIG. 1). The working medium is partially vaporized in vaporizer-EGR heat exchanger 17 and the working medium flowing as a two-phase mixture out of vaporizer-EGR heat exchanger 17 is then supplied through line 13 to vaporizer-exhaust gas heat exchanger 16. The working medium is completely vaporized in vaporizer-exhaust gas heat exchanger 16 and superheated to a temperature of about 350° C. The exhaust gas passed through vaporizer-EGR heat exchanger 17 has temperatures in the range of 500° C. to 700° C. and the exhaust gas passed through vaporizer-exhaust gas heat exchanger 16 has temperatures in the range of 280° C. to 380° C. Therefore, first a preheating and partial vaporizing of the working medium is carried out in vaporizer-EGR heat exchanger 17 before it is supplied to vaporizer-exhaust gas heat exchanger 16. The working medium is supplied as a liquid with a very low temperature to vaporizer-EGR heat exchanger 17. Despite the high temperature of the exhaust gas passed through vaporizer-EGR heat exchanger 17, as a result, no temperatures that could lead to degradation of ethanol or the organic working medium occur in the working medium in vaporizer-EGR heat exchanger 17. Also, no hot spots occur as a result at vaporizer-EGR heat exchanger 17. The thermal stress of the mechanical components of vaporizer-EGR heat exchanger 17 is therefore low, so that as a result vaporizer-EGR heat exchanger 17 advantageously has a very long service life.

Viewed overall, major advantages are associated with internal combustion engine 1 of the invention and the method of the invention. The working medium is heated only slightly in vaporizer-EGR heat exchanger 17 and in the vaporizer-exhaust gas heat exchanger 16 due to the temperature of the exhaust gas, which flows through vaporizer-exhaust gas heat exchanger 16, is heated only to temperatures of a maximum of 350° C. in vaporizer-exhaust gas heat exchanger 16. As a result, the thermal stresses of vaporizer-EGR heat exchanger 17 can be kept very low and working medium temperatures, which can lead to degradation of ethanol or the organic working media, do not occur either at vaporizer-EGR heat exchanger 17 or especially at vaporizer-exhaust gas heat exchanger 16. The lubricating oil as well, present in the working medium, is not degraded thereby, because the working medium leaves vaporizer-exhaust gas heat exchanger 16 with a temperature of a maximum of 350° C. and is then supplied in gaseous form to expander 18. As a result, degradation of the working medium can be avoided and a high service life of vaporizer-EGR heat exchanger 17 and also of vaporizer-exhaust gas heat exchanger 16 can be achieved in a technically simple manner without a costly regulation of the mass flow of the working medium.

Figure 2:
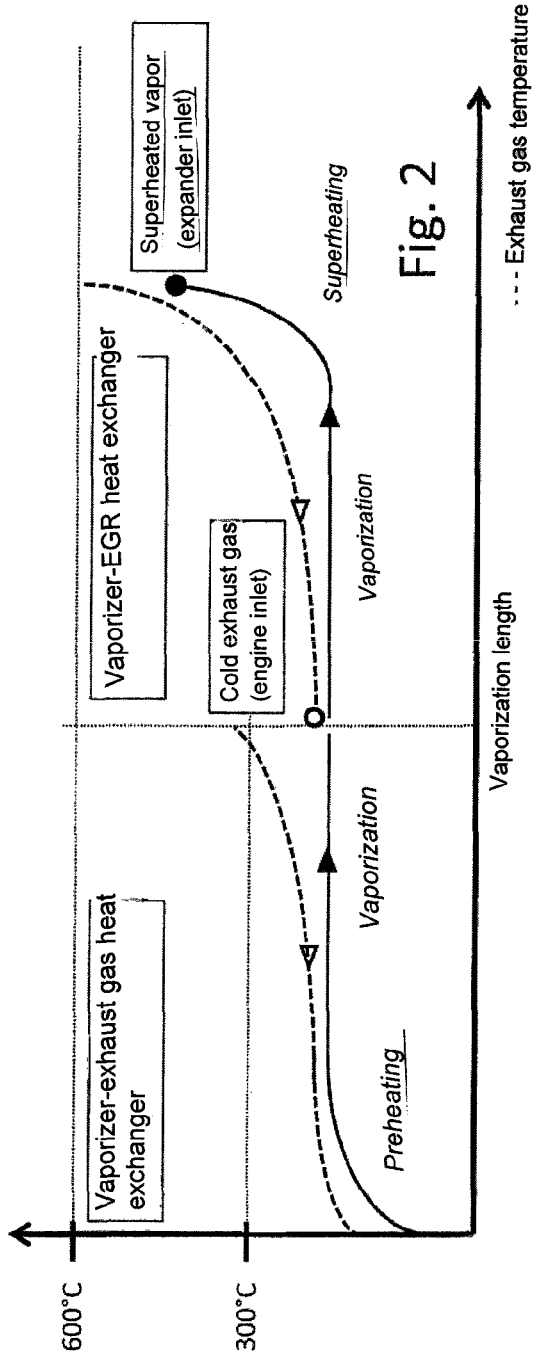
FIG. 2 shows a temperature diagram for a device according to the state of the art.
Figure 3:
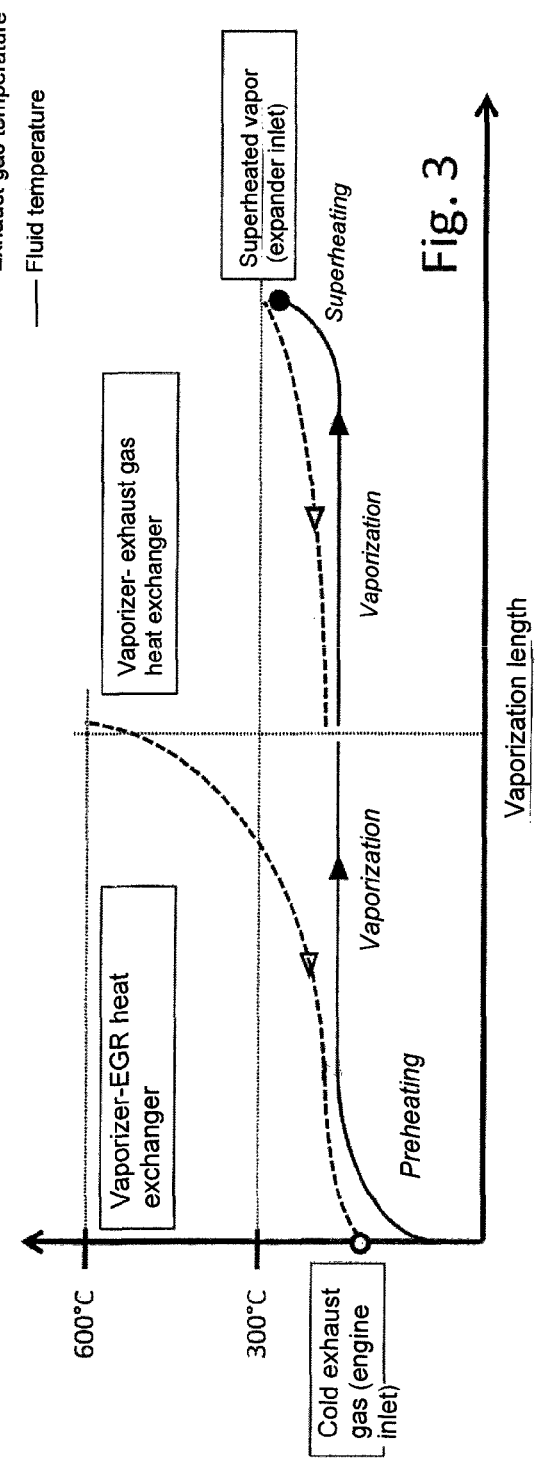
FIG. 3 shows a temperature diagram for a device of the invention.

The basic temperature profiles of the exhaust gas side and the fluid side are depicted again in FIG. 2 and FIG. 3. FIG. 2 shows the profiles for a serial connection according to the state of the art. Here, high vapor temperatures occur and the cooling of the exhaust gas is still not sufficient, so that a second coolant-cooled exhaust gas cooler must be arranged downstream of the vaporizer to achieve the low exhaust gas temperature required for emissions.

FIG. 3 shows the temperature profiles for the connection according to the invention. In this case, both low exhaust gas discharge temperatures (cold exhaust gas) and also only moderate vapor temperatures (expander inlet) are achieved, so that improvement with respect to stability and also risk of degradation in the case of organic working media is achieved.

The invention claimed is:

1. An internal combustion engine having a system for utilizing the waste heat from the internal combustion engine via the Clausius-Rankine cycle process, the system comprising:
a circuit having lines with a working medium,
a working medium pump for delivering the working medium,
a vaporizer-exhaust gas heat exchanger and a vaporizer-EGR heat exchanger for heating and/or vaporizing the working medium with the exhaust gas,
an expander,
a condenser for liquefying the working medium, and
an exhaust gas recirculation line that connects from the internal combustion engine directly to the vaporizer-EGR heat exchanger, such that a portion of the exhaust gas exiting from the internal combustion engine is supplied directly to the vaporizer-EGR heat exchanger, wherein a first line of the circuit for the working medium is run from the condenser to the vaporizer-EGR heat exchanger, so that the working medium after flowing through the condenser first flows through the vaporizer-EGR heat exchanger and a second line of the circuit for the working medium is run from the vaporizer-EGR heat exchanger to the vaporizer-exhaust gas heat exchanger, so that the working medium after flowing through the vaporizer-EGR heat exchanger first flows through the vaporizer-exhaust gas heat exchanger.

2. An internal combustion engine according to claim 1, wherein the working medium, passed through the vaporizer-EGR heat exchanger, is exclusively the working medium discharged from the condenser, or wherein the working medium, passed through the vaporizer-exhaust gas heat exchanger, is exclusively the working medium discharged directly from the vaporizer-EGR heat exchanger.

3. The internal combustion engine according to claim 1, wherein the circuit for the working medium does not have a line leading directly from the condenser to the vaporizer-exhaust gas heat exchanger or wherein an outlet opening for the exhaust gas from the vaporizer-exhaust gas heat exchanger opens into the environment and an outlet opening for the exhaust gas from the vaporizer-EGR heat exchanger opens into a charge air line.

4. The internal combustion engine according to claim 1, wherein the working medium and the exhaust gas are conveyed according to a counterflow principle through the vaporizer-exhaust gas heat exchanger.

5. The internal combustion engine according to claim 1, wherein the working medium and the exhaust gas are conveyed according to a counterflow principle through the vaporizer-EGR heat exchanger.

6. A method for operating an internal combustion engine having a system for utilizing the waste heat from the internal combustion engine via the Clausius-Rankine cycle process, comprising:
passing a working medium through a line that runs from a vaporizer-EGR heat exchanger to a vaporizer-exhaust gas heat exchanger, such that the working medium is run from the vaporizer-EGR heat exchanger to the vaporizer-exhaust gas heat exchanger so that the working medium is heated and vaporized,
passing an exhaust gas through the vaporizer-exhaust gas heat exchanger and the vaporizer-EGR heat exchanger,
conveying the gaseous working medium to an expander in which the gaseous working medium expands and performs work,
conveying the gaseous working medium from the expander to a condenser, and
cooling and condensing the working medium in the condenser, wherein the working medium, after passage through the condenser, is supplied to the vaporizer-EGR heat exchanger, and
wherein the exhaust gas passing through the vaporizer-EGR heat exchanger is supplied to the vaporizer-EGR heat exchanger directly from the internal combustion engine.

7. The method according to claim 6, wherein the working medium after passage through the vaporizer-EGR heat exchanger is supplied exclusively to the vaporizer-exhaust gas heat exchanger.

8. The method according to claim 6, wherein the working medium during conveying from the condenser to the vaporizer-EGR heat exchanger is not passed through any heat exchanger, or wherein the working medium during conveying from the vaporizer-EGR heat exchanger to the vaporizer-exhaust gas heat exchanger is not passed through any heat exchanger.

9. The method according to claim 6, wherein the exhaust gas passed through the vaporizer-exhaust gas heat exchanger is discharged into an environment and the exhaust gas passed through the vaporizer-EGR heat exchanger is supplied to the internal combustion engine.

10. The method according to claim 6, wherein the working medium is passed through the condenser, the vaporizer-exhaust gas heat exchanger, and the vaporizer-EGR heat exchanger and the working medium is delivered by a working medium pump to the vaporizer-EGR heat exchanger.

11. An internal combustion engine according to claim 1, further including a collecting and equalizing tank for the working medium, the collecting and equalizing tank being positioned between the condenser and the working medium pump.

12. The internal combustion engine according to claim 1, wherein the exhaust gas recirculation line also connects from the vaporizer-EGR heat exchanger to a charge air line.

13. The internal combustion engine according to claim 1, further comprising a coolant heat exchanger connected between the internal combustion engine and the condenser.

* * * * *